United States Patent
Chauvin et al.

(10) Patent No.: US 9,744,711 B2
(45) Date of Patent: *Aug. 29, 2017

(54) METHOD AND APPARATUS FOR BLOWING AND FILLING CONTAINERS WITH RELEASE OF LIQUID OVERPRESSURE

(71) Applicant: NESTEC S.A., Vevey (CH)

(72) Inventors: Guillaume Chauvin, Monthureux sur Saone (FR); Damien Kannengiesser, Golbey (FR); Johannes Zimmer, Saarbruecken (DE)

(73) Assignee: Discma AG, Hunenburg (CH)

( * ) Notice: Subject to any disclaimer, the term of this patent is extended or adjusted under 35 U.S.C. 154(b) by 350 days.

This patent is subject to a terminal disclaimer.

(21) Appl. No.: 14/383,006

(22) PCT Filed: Feb. 27, 2013

(86) PCT No.: PCT/EP2013/053903
§ 371 (c)(1),
(2) Date: Sep. 4, 2014

(87) PCT Pub. No.: WO2013/131793
PCT Pub. Date: Sep. 12, 2013

(65) Prior Publication Data
US 2015/0075119 A1    Mar. 19, 2015

(30) Foreign Application Priority Data

Mar. 8, 2012  (EP) .................................. 12158583

(51) Int. Cl.
*B29C 49/58*    (2006.01)
*B29C 49/12*    (2006.01)
(Continued)

(52) U.S. Cl.
CPC .............. *B29C 49/58* (2013.01); *B29C 49/12* (2013.01); *B29C 49/4289* (2013.01);
(Continued)

(58) Field of Classification Search
None
See application file for complete search history.

(56) References Cited

U.S. PATENT DOCUMENTS

2014/0305081 A1*  10/2014  Chauvin ................. B29C 49/10
                                                53/453

FOREIGN PATENT DOCUMENTS

DE          20105716         7/2002
DE       102007024106       11/2008
(Continued)

OTHER PUBLICATIONS

International Search Report for International Application No. PCT/EP2013/053903 dated May 15, 2013.
(Continued)

*Primary Examiner* — Monica Huson
(74) *Attorney, Agent, or Firm* — Eric J. Sosenko; Jonathan P. O'Brien; Honigman Miller Schwartz and Cohn LLP

(57) ABSTRACT

The invention concerns an apparatus for blowing and filling a container (22) from a preform (16), said apparatus comprising: —a mold (12) for enclosing a preform (16), —stretching means for stretching the preform (16) placed within said mold (12), —a pressurized liquid injection circuit (18) able to inject a liquid under pressure inside said preform (16) when said preform is placed inside said mold, —injection means which are adapted to inject a predetermined volume of liquid through said liquid injection circuit (18) into the preform and to stop injection of the liquid through said circuit into the preform when a blown and filled
(Continued)

Fig.1 container (22) has been obtained, stopping the injection of the liquid through the liquid injection circuit into the preform creating an overpressure of the liquid within the liquid injection circuit, characterized in that the apparatus further comprises releasing means for releasing said overpressure of the liquid within the liquid injection circuit.

16 Claims, 6 Drawing Sheets

(51) Int. Cl.
*B65B 3/02* (2006.01)
*B29C 49/42* (2006.01)
*B29C 49/78* (2006.01)
*B29C 49/46* (2006.01)
*B29C 49/02* (2006.01)
*B29K 105/00* (2006.01)
*B29L 31/00* (2006.01)

(52) U.S. Cl.
CPC ............ *B29C 49/46* (2013.01); *B29C 49/783* (2013.01); *B65B 3/022* (2013.01); *B29C 2049/024* (2013.01); *B29C 2049/4655* (2013.01); *B29C 2049/4664* (2013.01); *B29C 2049/5803* (2013.01); *B29K 2105/258* (2013.01); *B29L 2031/7158* (2013.01)

(56) References Cited

FOREIGN PATENT DOCUMENTS

| WO | WO2009068144 | 6/2009 |
|---|---|---|
| WO | WO2011076167 | 6/2011 |

OTHER PUBLICATIONS

International Written Opinion for International Application No. PCT/EP2013/053903 dated May 15, 2013.

\* cited by examiner

METHOD AND APPARATUS FOR BLOWING AND FILLING CONTAINERS WITH RELEASE OF LIQUID OVERPRESSURE

CROSS REFERENCE TO RELATED APPLICATIONS

The present application is a National Stage of International Application No. PCT/EP2013/053903, filed on Feb. 27, 2013, which claims priority to European Patent Application No. 12158583.0, filed Mar. 8, 2012, the entire contents of which are being incorporated herein by reference.

FIELD OF THE INVENTION

The invention relates to a method and an apparatus for blowing and filling containers from preforms.

BACKGROUND OF THE INVENTION

Plastic containers such as bottles of water are manufactured and filled according to different methods including blow moulding or stretch-blow moulding.

According to one of these known methods a plastic preform is first manufactured through a moulding process and then heated before being positioned inside a blowing mould.

The preform usually takes the form of a cylindrical tube closed at its bottom end and open at its opposite end.

Once the preform has been positioned within the mould only the open end of the preform is visible from above the mould.

The above-mentioned method makes use of a stretch rod which is downwardly engaged into the open end of the preform so as to abut against the closed bottom end thereof. The stretch rod is further actuated to be urged against the closed end, thereby resulting in stretching the preform.

After the stretching phase has been initiated a liquid is injected into the preform through its open end during a filling phase, as disclosed for instance in Applicant's patent EP 1 529 620 B1. This liquid injection causes expansion of the preform until coming into contact with the inner walls of the mould, thereby achieving the final shape of the bottle.

The Applicant has noticed that at the end of the filling phase when liquid injection is stopped, a back pressure occurs in the pressurized liquid injection circuit due to the nearly incompressibility of liquids.

This back pressure phenomenon causes mechanical stresses and possibly damages to different components which are used in connection with the liquid injection circuit.

More particularly, the above-described blowing and filling method makes use of a piston device for pushing the liquid throughout the liquid injection circuit for its injection into the preform.

Filling of the preform with liquid is performed and requires deceleration of the filling pace at the end of the filling phase.

However, control of deceleration proves to be very difficult with today hydraulic, pneumatic or electric technology.

In particular, due to inertia the piston device is always moving beyond the requested stopping point.

As the liquid is nearly incompressible, this results in a high pressure of liquid, thereby giving rise to the back pressure phenomenon within the liquid injection circuit.

The mechanical components which are in connection with the liquid circuit are thus submitted to mechanical stresses due to back pressure.

These stresses and their impact on the components repeat over time, which therefore leads to a reduced life time of these components.

Also, an inefficient control of liquid filling deceleration may lead to breakage of the container.

SUMMARY OF THE INVENTION

In this respect, the invention is a method as defined in claim 1.

Thus, the overpressure is evacuated or discharged from the pressurized liquid injection circuit, which avoids repeated stresses on components that are in connection with this circuit and possible damages thereon over time.

Also, the invention makes it possible to fill the container at a high speed toward the end of the injection phase.

According to a possible feature, the method comprises opening a valve device that is connected to the pressurized liquid injection circuit so as to release said overpressure of liquid.

This is an easy and efficient way to evacuate or discharge the overpressure of liquid from the pressurized liquid injection circuit.

The discharge through the valve device may be operated automatically once a predetermined threshold of pressure has been reached or upon command.

According to a further possible feature, the valve device is located close to the place where liquid is injected into the preform. For example, the valve device is located close, or even attached to an injection head that is used for injecting the liquid into the preform.

According to another possible feature, the method comprises releasing said overpressure of liquid by discharging it through an expansion tank.

This is another easy and efficient way to evacuate or discharge the overpressure of liquid. This way of releasing the overpressure may be implemented automatically once a given level of pressure has been reached.

According to a possible feature, the stopping of the injection phase further comprises closing an injection valve device, said closing of the injection valve device enabling communication of liquid between the pressurized liquid injection circuit and at least one discharge channel through which the overpressure is released.

Thus, another way to release the overpressure may be automatically implemented with the closing of the injection valve device. No separate action has to be performed for releasing the overpressure.

The single closing of the injection valve device triggers the overpressure release. This therefore makes easy, reliable and efficient the implementation of the method.

According to a further possible feature, closing the injection valve device both prohibits the liquid that is in the pressurized liquid injection circuit from flowing through the injection valve device for being injected into the preform and enables liquid communication between the pressurized liquid injection circuit and the at least one discharge channel.

According to another possible feature, the starting of the injection phase comprises opening the injection valve device so as to enable flowing of the liquid that is pushed inside the pressurized liquid injection circuit through the open injection valve device for being injected into the preform.

According to a possible feature, the injection phase starts after the stretching phase has started.

According to another aspect, the invention is an apparatus in accordance with claim 8.

This apparatus provides a simple solution to remedy at least one of the above-mentioned drawbacks.

In particular, the liquid overpressure releasing means are actuated or activated before that the blown and filled container is released or extracted from the mould.

According to another possible feature, the releasing means comprise at least one valve device that is connected to the pressurized liquid injection circuit and that is adapted to be opened so as to release said overpressure of liquid.

Arranging a mere valve device (or several ones) in connection with the pressurized liquid injection circuit enables easy and efficient release of the liquid overpressure.

According to a possible feature, said at least one valve device is designed so as to be automatically opened for a predetermined pressure of liquid.

According to a possible feature, said at least one valve device is a controlled valve.

According to a possible feature, the releasing means comprise an expansion tank that is connected to the pressurized liquid injection circuit.

According to another possible feature, the injection means comprise an injection valve device that includes at least one discharge channel and that is suitable for moving between an open and a closed position, the open position being such that it authorizes the liquid that is injected through the pressurized liquid injection circuit to flow through the open injection valve device for being injected into the preform, the at least one discharge channel being not in communication with the pressurized liquid injection circuit, the closed position being such that it does no longer authorise the liquid to flow though the closed injection valve device and it enables communication between the pressurized liquid injection circuit and the at least one discharge channel for the release of the overpressure therethrough.

Thus, the injection valve device performs two different functions when in closed position: preventing any further flow of liquid from passing through the valve device for being injected into the preform and simultaneously releasing or discharging the overpressure through the at least one discharge channel.

These releasing means are quite simple and efficient.

According to a possible feature, the injection valve device is suitable for moving along a longitudinal axis between the open and closed position and the pressurized liquid injection circuit is connected to the injection valve device transversally relative to said longitudinal axis.

Thus, the liquid inlet to the injection valve device is lateral.

According to a possible feature, the injection valve device is a piston device.

According to still another possible feature, the injection means comprise an injection head that is arranged above the mould and in sealing engagement therewith, the injection valve device being mounted within the injection head.

The pressurized liquid injection circuit is laterally connected to the injection head relative to the longitudinal axis of said injection head. It is to be noted that the injection valve device is axially movable along this longitudinal axis between the open and closed position.

BRIEF DESCRIPTION OF THE DRAWINGS

Embodiments of the present invention will now be described, by way of example only, with reference to the accompanying figures in which.

DETAILED DESCRIPTION OF THE INVENTION

Figure 1:
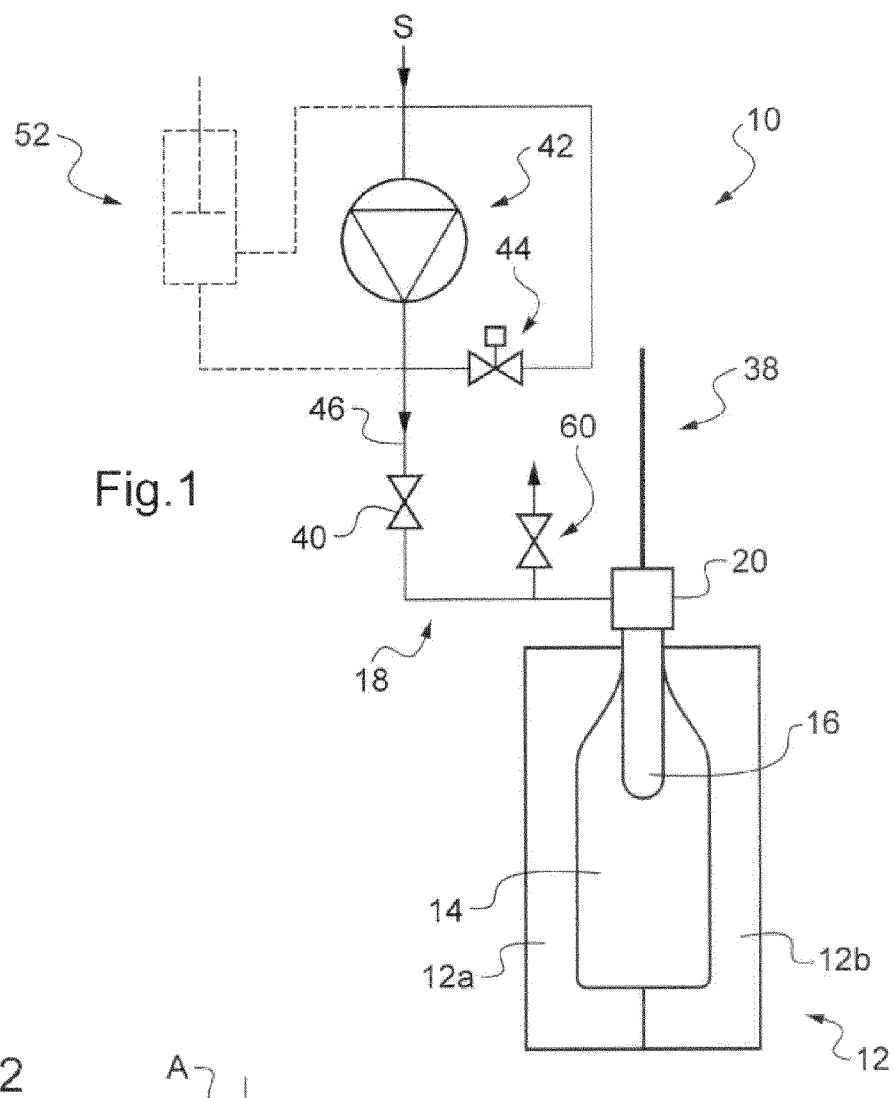
FIG. 1 is a schematic overall view of a system according to a first embodiment of the invention.

FIG. 1 schematically represents an apparatus 10 for simultaneously blowing and filling containers, such as bottles, from preforms, according to an embodiment of the invention.

These preforms may be made of thermoplastic polymer.

Apparatus 10 comprises a mould 12 for enclosing a preform.

Mould 12 is for example a two-part mould of which the two parts 12a, 12b define an inner cavity 14 when assembled together.

As represented in FIG. 1, a preform 16 is inserted into cavity 14 at the beginning of a blowing and filling method according to the invention or just before.

The shape of the cavity corresponds to the shape of the achieved container and it will be wholly occupied by the formed container at the end of the blowing and filling method.

It is to be noted that mould 12 may alternatively be composed of more than two parts depending on the manufacturing process.

For instance, a third part (base mould) may be added at the bottom of the mould so as to constitute at least a part of the inner cavity bottom.

Apparatus 10 further comprises a pressurized liquid injection circuit 18 and injection means for injecting a liquid into preform 16.

Injection means comprise an injection head 20 which comes into a sealing contact (for liquid tightness purpose) with mould 12 and preform 16.

Figure 2:
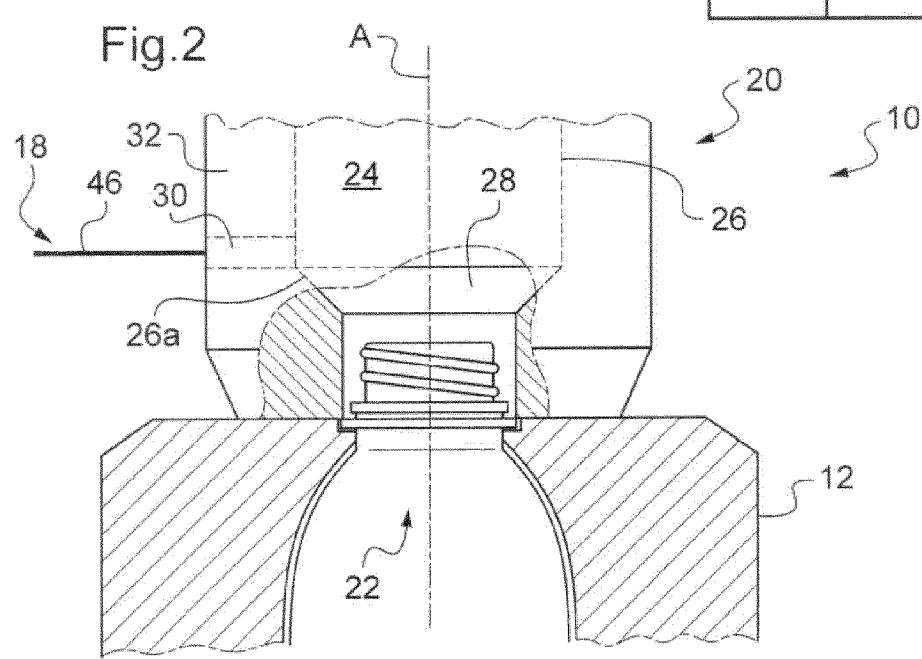
FIG. 2 is a schematic enlarged partial view of the injection head and mould of FIG. 1.

FIG. 2 is a schematic enlarged partial view of injection head 20 disposed above mould 12.

Mould 12 encloses a blown and filled container 22 (here, for example, a bottle filled with water) that has been obtained from preform 16 through the blowing and filling method.

The injection head comprises an injection valve device 24 that includes an injection nozzle 28 mounted within an inner housing 26.

Injection head 20 is substantially cylindrical in shape as partially illustrated in FIG. 2 and inner housing 26 is also cylindrical in shape and both are coaxial.

Injection valve device 24, and more particularly injection nozzle 28, is moveable along a longitudinal axis A between an injection position (open position) allowing liquid to be injected into the preform and a rest position (closed position) in which the injection nozzle 28 rests against an inner surface 26a of the injection head in a sealing engagement so as to prevent any flow of liquid from the injection head into the preform.

Longitudinal axis A is here the vertical axis along which injection head 20 and mould 12 are substantially aligned.

Axis A is a symmetry axis to container 22.

As represented in FIG. 2, injection nozzle 28 is in the closed position (lower position) which is occupied when the container has been blown and filled at the end of the manufacturing method.

In the open position injection nozzle 28 is in an upper position at a distance from the inner surface 26a. This upper position is not represented in the drawing for the sake of clarity but it is located above a transverse channel 30 (represented in dotted lines) that is provided in a peripheral wall 32 of injection head 20.

This feed channel is connected to pressurized liquid injection circuit 18.

Moving the injection nozzle 28 away from inner surface 26a and above channel 30 makes it possible for the liquid that is in the circuit 18 to flow from channel 30 to the preform (in FIG. 2 the preform is replaced with the formed container 22).

Figure 3:
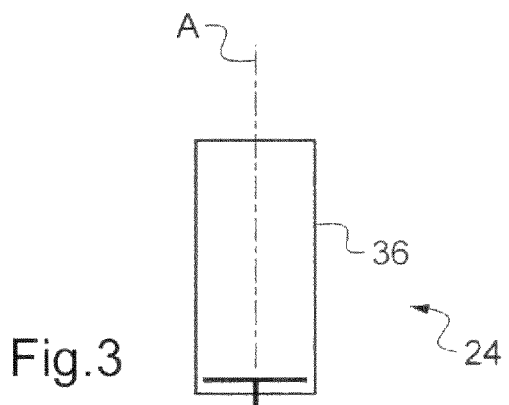
FIG. 3 is a schematic view of an injection piston device.

FIG. 3 schematically illustrates an example of injection valve device 24.

Injection valve device 24 is an injection piston device that is operated thanks to a fluid, e.g. air. Other fluids may be used alternatively.

Fluid-operated piston device 24 comprises a piston 34 that is sliding longitudinally (along axis A) within a cylindrical housing 36 and a rod 35 provided with injection nozzle 28 at its end.

Fluid is supplied to piston device 24 by a fluid supply system (not represented in the drawing) which comprises controlling means (not represented) for controlling the supply of fluid to piston device 24.

The control of the fluid supply enables appropriate upward and downward movements of injection nozzle 28 along axis A so as to occupy either open or closed position.

Reverting to FIG. 1, apparatus 10 also comprises stretching means 38 for stretching preform 16 when enclosed within mould 12.

Stretching means comprise a stretch rod 38 which is in a sliding connection with the injection nozzle 28.

In FIG. 2, the stretch rod is not represented for the sake of clarity. For example, stretch rod 38 may be in alignment with axis A and traverse injection nozzle 28 in a fluid-tight manner.

The stretch rod 38 of FIG. 1 embodiment is actuated upon command to be inserted downwardly into preform 16 so as to stretch the latter while a filling liquid is injected thereinto with a view to causing expansion of said preform within the mould.

Actuating means for actuating rod 38 have not been represented for the sake of clarity.

Apparatus 10 comprises a valve device 40 that enables flowing of liquid through circuit 18 when opened and prevents liquid from flowing through the valve device and downstream thereof when closed.

Valve device 40 is actuated upon command.

Liquid to be injected into the preform, e.g. water, is supplied from a source of liquid S which feeds said liquid to a pump device 42 of apparatus 10.

Pump device 42 is located upstream of valve device 40.

Such a pump device is suitable for delivering a constant pressure, e.g. between 3 and 7 bars.

Pump device 42 is suitable for providing a predetermined volume of liquid and pushing or injecting it through liquid injection circuit 18. Pump device 42 is part of the injection means of apparatus 10 and acts as liquid pushing means.

As further represented in FIG. 1, a flow valve 44 is mounted in parallel of pump device 42 as a safety valve.

This valve acts as a discharge valve in order to protect the pump device, for instance when the liquid pressure is building up or if there is no container being manufactured.

Apparatus 10 comprises a duct 46 that is connected to pump device 42 at one end and to injection head 20 at the opposite end. Valve device 40 is mounted onto duct 46. It is to be noted that duct 46 is part of liquid injection circuit 18.

In a variant embodiment illustrated in dotted lines in FIG. 1, liquid pushing means 52 may be used as an alternative to pump device 42.

Pushing means 52 are here represented by a piston device that is able to displace a predetermined volume of liquid through liquid injection circuit 18 and, more particularly, duct 46.

It is to be noted that any other means that are capable of displacing a volume of liquid may be alternatively used.

Apparatus 10 also comprises a valve device 60 that is connected to liquid injection circuit 18 and here, more particularly, to duct 46.

As represented in FIG. 1, valve device 60 is located close to injection head 20. In particular, it is located as close as possible to injection head 20 in order to reduce as much as possible the dead volume.

In the course of performance of the blowing and filling method according to an embodiment of the invention, the stretch rod 38 is actuated during a stretching phase whereas valve device 40 is in a closed position, thereby preventing liquid from being injected into preform 16.

Stretch rod 38 is downwardly engaged into the open end of the preform 16 so as to come into contact with the closed bottom end thereof. The stretch rod is then further actuated to push the closed end downwardly and stretch the preform accordingly in a controlled manner.

After a predetermined period of time has elapsed after the start of the stretching phase, the injection phase starts for injecting the liquid into the preform both for forming the container and filling it.

The injection phase starts with the opening of valve device 40 and operation of pump device 42 (or, alternatively, piston device 52). Actuation of valve device 40 may be controlled through a processor or a computer or manually.

Also injection nozzle 28 is actuated to be raised in its upper position (open position).

Pump device 42 (or piston device 52) is operated in a controlled manner so that liquid is pushed or injected through liquid injection circuit 18 and injection head 20 to preform 16 (for being injected thereinto) in accordance with a predetermined injection or filling curve.

Figure 4:
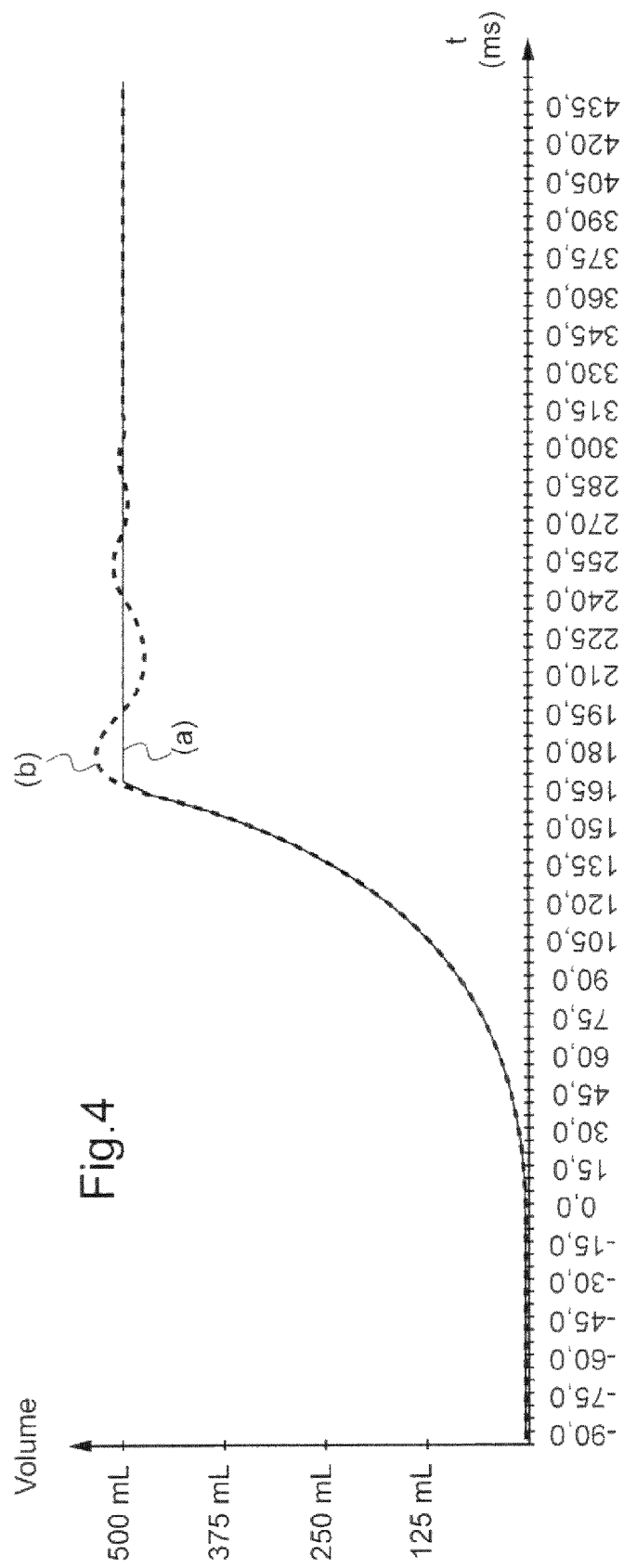
FIG. 4 schematically illustrates a curve representing the variation in time of the volume of liquid injected into the preform.

FIG. 4 represents the variation over the time of the volume of liquid that is injected or displaced by pump device 42 during the injection phase.

A curve referred to as (a) represents the desired theoretical curve of liquid injection over the time. This curve comprises a first portion in which the volume of liquid increases and a second flat portion in which the volume has reached a maximum value and is kept constant.

This liquid injection causes together with the movement of the stretch rod expansion of the preform 16 until coming into contact with the inner walls of the mould. The final stage of the container is thus achieved (FIG. 2).

At the beginning of the injection phase valve device 60 is in a closed position.

As represented in FIG. 4, the volume of liquid that is being displaced through liquid injection circuit 18 is greater than the volume required for filling the container. This additional volume of liquid is referred to as (b) on the curve.

By appropriately controlling the timing of the injection phase the injection nozzle 28 is actuated to be lowered for closing the liquid injection valve and pump device 42 (or piston device 52) is commanded to stop pushing or injecting liquid through circuit 18.

The additional volume of liquid pushed or injected into circuit 18 and, therefore duct 46, results in an increase in pressure (pressure in excess) within circuit 18 due to closing of injection nozzle 28.

In order to avoid a back pressure phenomenon within circuit 18 valve device 60 is commanded, by a processor or a computer or manually, to be open at an appropriate time relative to the FIG. 4 time-based volume curve (e.g. after a given period of time or time delay has elapsed). In particular, valve device 60 is opened when the required amount of liquid (volume) has been injected into the preform/container. Alternatively, valve device 60 is actuated to be opened depending on the position of piston device 52.

Thus, the volume of liquid in excess within duct 46 is discharged through valve device 60 so as to release the overpressure of liquid. The discharged liquid may then be recovered and recycled in this process.

Valve device 60 acts, therefore, as releasing means that enable release of a liquid overpressure (at the end of the injection phase) outside the liquid injection circuit.

By displacing a greater of volume of liquid during the injection phase and discharging this extra amount of liquid through valve device 60 (discharge valve) it is therefore made possible to attain the flat portion of the curve (a) in FIG. 4. It is also possible to complete the filling of the container at a high speed or filling rate.

Figure 5:
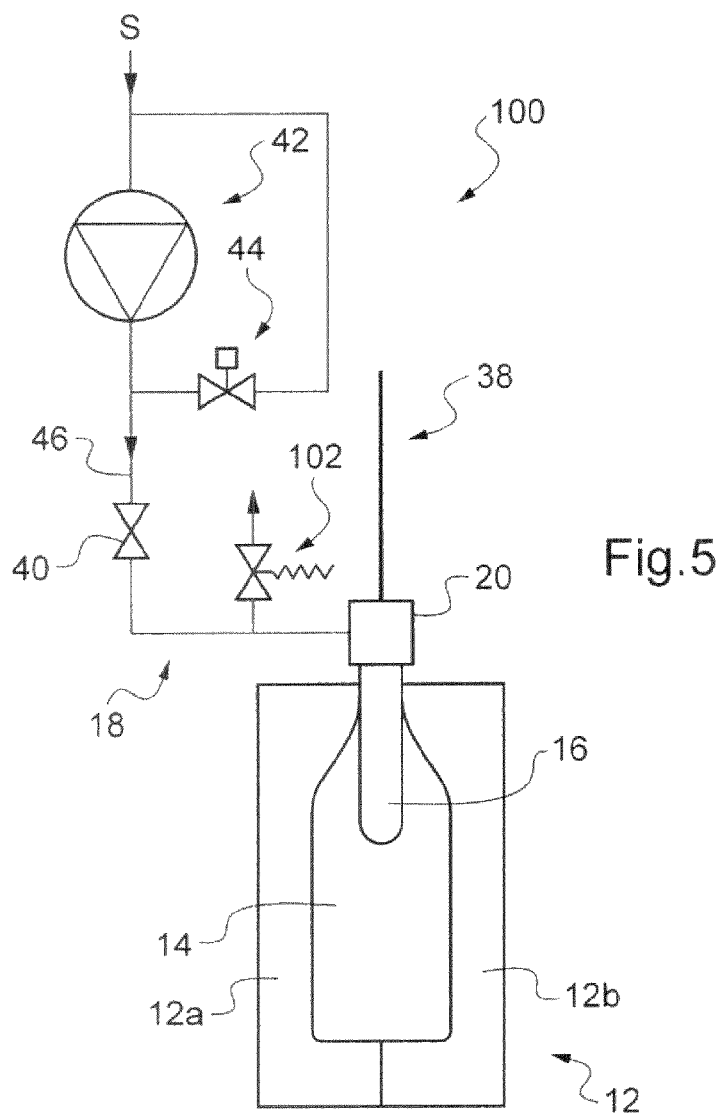
FIG. 5 is a schematic overall view of a system according to a first variant embodiment of the invention.

FIG. 5 illustrates an apparatus 100 for blowing and filling a container in accordance with a first variant embodiment of the invention.

Apparatus 100 differs from apparatus 10 of FIG. 1 by a controlled valve 102 which replaces valve device 60. All the other elements of apparatus 100 are identical to those of apparatus 10 and bear the same references.

Controlled valve 102 performs the same function as valve device 60, i.e. it releases the liquid overpressure outside the pressurized liquid injection circuit.

Controlled valve 102, therefore, behaves as a discharge valve.

Controlled valve 102 releases the overpressure of liquid automatically once the predetermined volume of liquid has been injected into the preform/container and a predetermined liquid pressure level has been reached within the liquid injection circuit.

Controlled valve 102 may have been pre-set accordingly through appropriate settings beforehand so as to open depending on the amount of liquid pressure within the circuit.

Alternatively, controlled valve 102 may be actuated based on a pressure switch.

Figure 6:
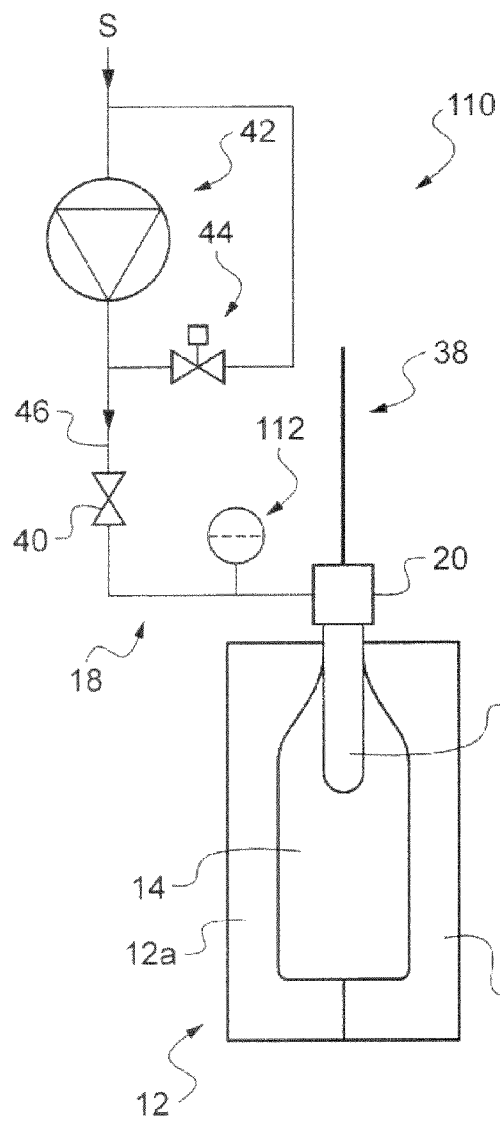
FIG. 6 is a schematic overall view of a system according to a second variant embodiment of the invention.

FIG. 6 illustrates a second variant embodiment of an apparatus 110 according to the invention.

Apparatus 110 differs from apparatus 10 by an expansion tank 112 which replaces valve device 60. All the other elements of system 110 are identical to those of apparatus 10 and bear the same references.

Expansion tank 112 performs the same function as valve device 60, i.e. it releases the liquid overpressure outside the liquid injection circuit and, therefore, discharges the latter from this pressure in excess as soon as the pressure within the liquid injection circuit 18 has reached a predetermined value or level (threshold).

Figure 7A:
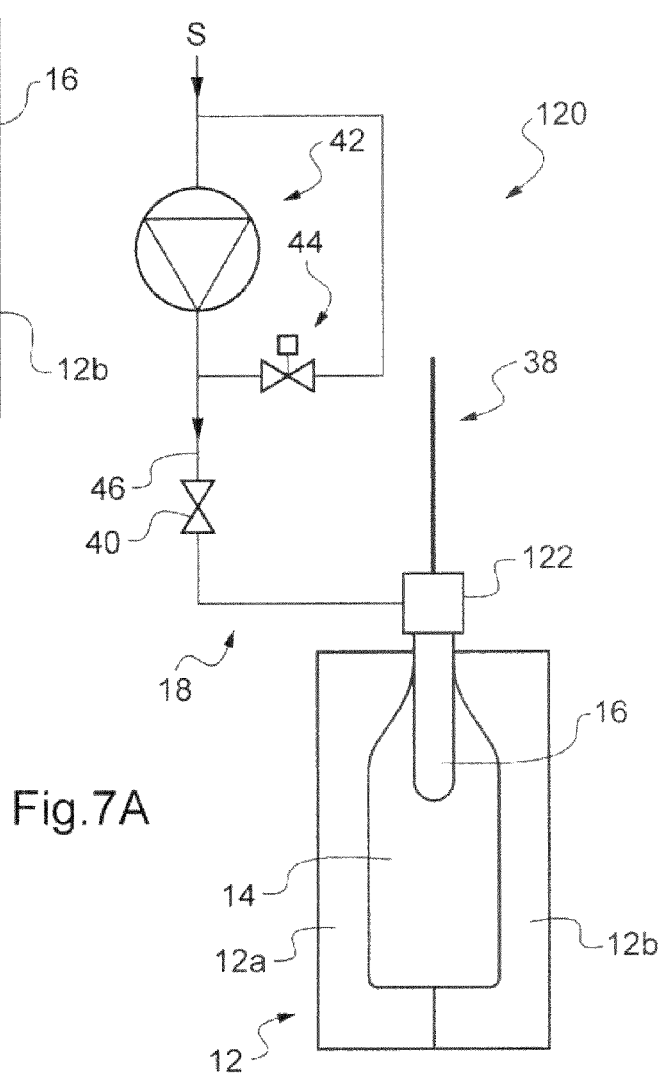
FIG. 7A is a schematic overall view of a system according to a second embodiment of the invention.

FIG. 7A illustrates a second embodiment of an apparatus 120 for blowing and filling a container according to the invention.

Figure 7B:
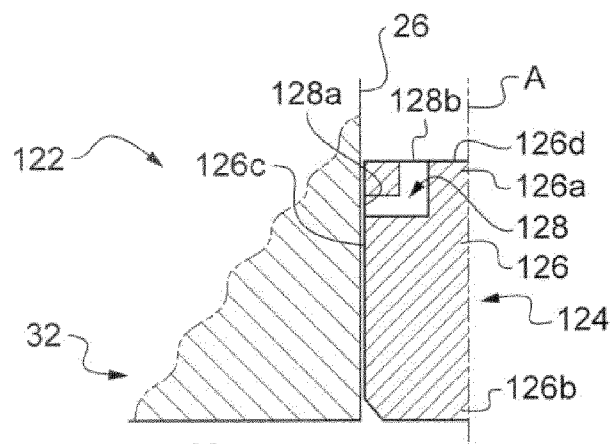
FIGS. 7B and 7C are schematic enlarged partial views of the injection head of FIG. 7A system in an open and closed position of the injection nozzle.
Figure 7C:
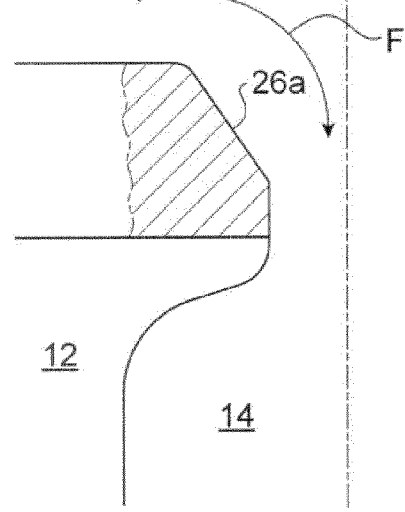
Figure 7C:
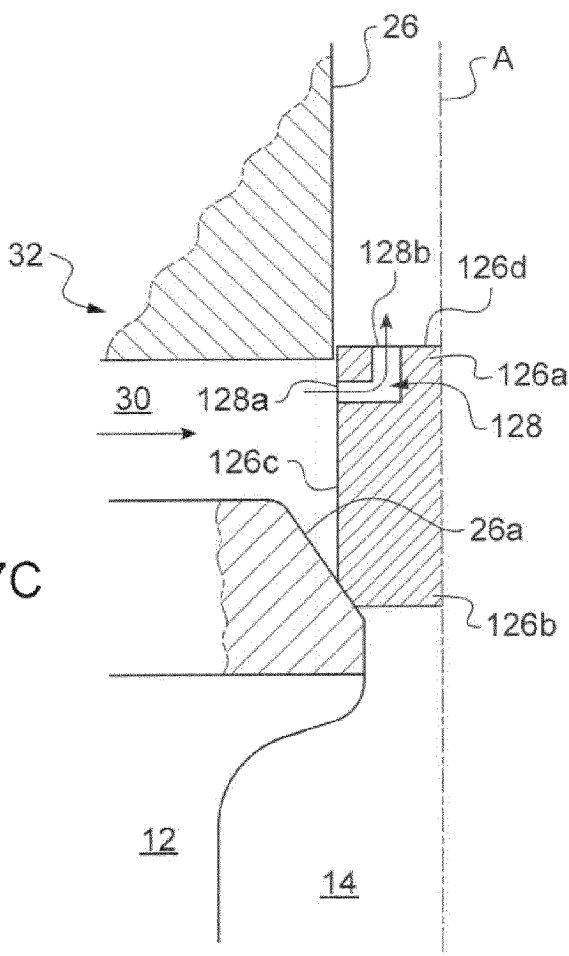

Apparatus 120 is almost identical to FIG. 1 apparatus 10 except that discharge valve device 60 has been removed and injection head 20 (partially represented in FIG. 2) has been modified as illustrated in FIGS. 7B and 7C.

Apparatus 120 comprises a modified injection head 122 with a new injection valve device arrangement 124.

The enclosure or casing in which injection valve device 124 is installed is the same as that described with reference to FIG. 2. The illustration of the arrangement between injection head 122 and mould 12 has been voluntarily simplified for the sake of clarity. Only mould 12 and its internal cavity 14 have been represented.

More particularly, the injection nozzle 126 of injection valve device 124 forms a body at the upper part 126a of which a discharge channel 128 is provided.

The lower part 126b of the body remains the same as that of injection nozzle 28 in FIG. 2. This lower part has a liquid-tight function which is carried out when injection nozzle 126 is in a lower closed position (FIG. 7C) and bears against the inner surface 26a. In the upper open position of the injection nozzle (FIG. 7B) lower part 126b does not serve this purpose.

As represented in FIG. 7B, discharge channel 128 has two opposite ends, a first end 128a that opens onto a lateral or side face 126c of the injection nozzle body and a second end 128b that opens onto a top face 126d of the body.

Discharge channel 128 forms a bend between its two opposite ends. The bend illustrated in FIG. 7B is at right angle. However, a bend with a smoother curvature may be alternatively used. It is to be noted that the channel may instead have a rectilinear inclined shape from side face 126a to top face 126d.

In FIG. 7B discharge channel 128 is facing the inner wall of inner housing 26.

It is to be noted that several discharge channels may be used instead of a single one in order to augment the flow rate. As represented in FIG. 7B, injection nozzle 126 has been raised in the upper open position so as to authorize the liquid that is pushed by pump device 42 through pressurized liquid injection circuit 18 and channel 30 to flow through the open valve as indicated by the arrow F. The liquid that is authorized to pass is injected into the preform placed within cavity 14 in the course of operation of the injection phase.

When the injection phase terminates, injection nozzle 126 is commanded to be lowered in the lower closed position of FIG. 7C and lower part 126b comes into a sealing engagement with inner surface 26a.

Also pump device 42 is commanded to stop pushing or injecting a volume of liquid into the liquid injection circuit 18.

Thus, the injection nozzle 126 occupies the axial position represented in FIG. 7C, thereby obstructing any further flow of liquid to be injected into the container that has been formed.

In this axial position the discharge channel 128 is facing feed channel 30 which is connected to duct 46. Thus, a communication is established between channel 30 and discharge channel 128 so as to enable circulation of liquid through the latter. This discharge of liquid enables release of the liquid overpressure that is present within liquid injection circuit 18.

Liquid discharge is evacuated from top of the injection nozzle with a view to being recovered and possibly recycled.

Liquid discharge stops naturally when the pressure within the container is at the atmospheric pressure if the discharge channel or circuit is vented to the atmospheric pressure.

The location of discharge channel 128 is adjusted along the height or axial extension of the injection nozzle body (axis A) so as to provide efficient release of the liquid overpressure.

In a variant embodiment, discharge channel 128 may be disposed in a lower position, i.e. its lateral opening end 128*a* may be lowered, which lengthens the channel. Its curvature may be the same as that illustrated in FIG. 7C or different.

By way of example, the diameter of this channel is 6 mm.

More generally, the diameter may lie between 4 mm and 8 mm.

The apparatus according to the invention is particularly suitable for manufacturing lightweight thermoplastic polymer containers.

Figure 8:
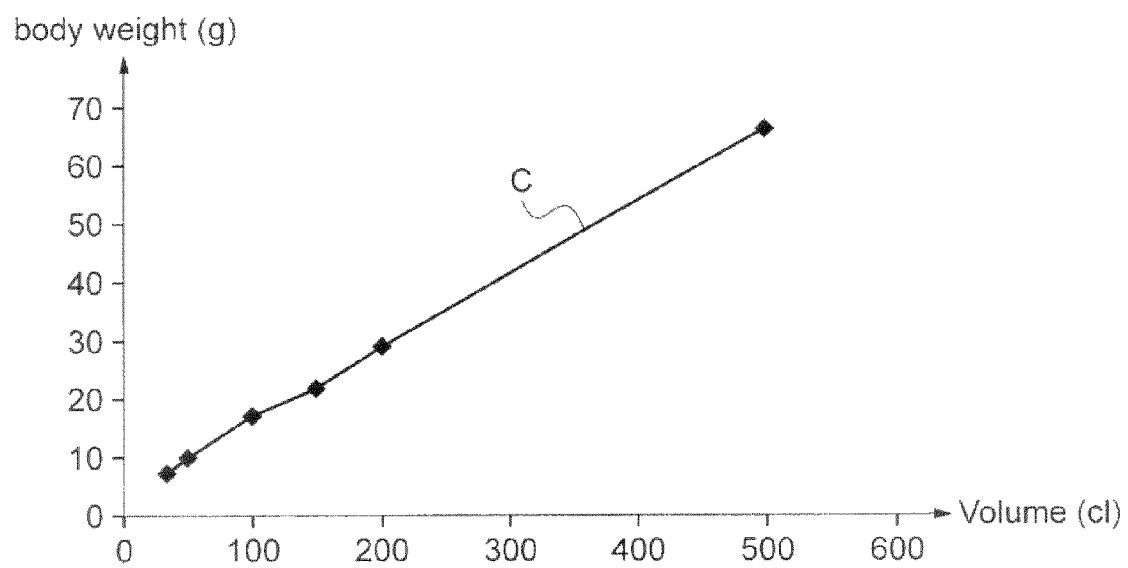
FIG. 8 is a graph representing the typical weight of a container body as function of its volume.

Lightweight preforms may be defined with respect to the graph of FIG. 8.

This graph illustrates the typical weight of a preform or container body expressed in grams (g) as a function of the volume of the latter expressed in centilitres (cl.).

The lightweight preforms or containers are located below the curve C.

In the present embodiment, the container which is being blown and filled is a bottle filled with still water.

However, other containers may be envisaged as well as other liquids.

Other graphs may be easily obtained by the person skilled in the art for defining lightweight containers intended to be filled with other liquids.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed:

1. A method of blowing and filling a container from a preform inside a filling and forming apparatus that comprises a mold and a pressurized liquid injection circuit able to inject a liquid under pressure inside the preform when the preform is placed inside the mold, the method comprising:
   placing a preform inside the mold;
   stretching the preform placed within the mold;
   starting an injection phase comprising injecting a predetermined volume of liquid through the liquid injection circuit into the preform;
   stopping the injection phase by stopping the injection of the liquid through the liquid injection circuit into the preform, creating an overpressure of liquid within the liquid injection circuit; and
   releasing the overpressure of liquid within the liquid injection circuit before the container is released from the mold.

2. A method of claim 1, comprising opening a valve device that is connected to the pressurized liquid injection circuit so as to release the overpressure of liquid.

3. A method according to claim 1, comprising releasing the overpressure of liquid by discharging at least some liquid through an expansion tank.

4. A method according to claim 1, wherein the stopping of the injection phase further comprises closing an injection valve device, the closing of the injection valve device enabling communication of liquid between the pressurized liquid injection circuit and at least one discharge channel through which the overpressure is released.

5. A method according to claim 4, wherein closing the injection valve device both prevents the liquid that is in the pressurized liquid injection circuit from flowing through the injection valve device for being injected into the preform, and enables liquid communication between the pressurized liquid injection circuit and the at least one discharge channel.

6. A method according to claim 4, wherein the start of the injection phase comprises opening the injection valve device so as to enable flowing of the liquid that is pushed inside the pressurized liquid injection circuit through the open injection valve device for being injected into the preform.

7. A method according to claim 1, wherein the injection phase starts after the stretching phase has started.

8. An apparatus for blowing and filling a container from a preform, the apparatus comprising:
   a mold for enclosing a preform;
   a stretching member for stretching the preform placed within the mold;
   a pressurized liquid injection circuit able to inject a liquid under pressure inside the preform when the preform is placed inside the mold;
   an injector which is adapted to inject a predetermined volume of liquid through the liquid injection circuit into the preform and to stop injection of the liquid through the circuit into the preform when a blown and filled container has been obtained, the stopping of the injection of the liquid through the liquid injection circuit into the preform creating an overpressure of liquid within the liquid injection circuit; and
   the apparatus comprises a releasing member for releasing the overpressure of liquid within the liquid injection circuit.

9. An apparatus according to claim 8, wherein the releasing member comprises at least one valve device that is connected to the pressurized liquid injection circuit and that is adapted to be opened so as to release the overpressure of liquid.

10. An apparatus according to claim 9, wherein the at least one valve device is designed so as to be automatically opened for a predetermined pressure of liquid.

11. An apparatus according to claim 9, wherein the at least one valve device is a controlled valve.

12. An apparatus according to claim 8, wherein the releasing member comprises an expansion tank that is connected to the pressurized liquid injection circuit.

13. An apparatus according to claim 8, wherein the injector comprises an injection valve device that includes at least one discharge channel and that is suitable for moving between an open and a closed position, the open position being such that it allows the liquid that is injected through the pressurized liquid injection circuit to flow through the open injection valve device for being injected into the preform, the at least one discharge channel not being in communication with the pressurized liquid injection circuit, the closed position being such that it does no longer allow the liquid to flow though the closed injection valve device and it enables communication between the pressurized liquid injection circuit and the at least one discharge channel for the release of the overpressure therethrough.

14. An apparatus according to claim 13, wherein the injection valve device is suitable for moving along a longitudinal axis between the open and closed position and the pressurized liquid injection circuit is connected to the injection valve device transversally relative to the longitudinal axis.

15. An apparatus according to claim 13, wherein the injection valve device is a piston device.

16. An apparatus according to claim 13, wherein the injector comprises an injection head that is arranged above the mold and in sealing engagement therewith, the injection valve device being mounted within the injection head.

* * * * *